United States Patent [19]

Nyffenegger

[11] 3,921,214

[45] Nov. 18, 1975

[54] CONTROL MECHANISM FOR HAND-HELD DICTATION APPARATUS WITH ERASURE PREVENTION CAPABILITIES

[75] Inventor: Willy Nyffenegger, Unterehrendingen, Switzerland

[73] Assignee: Dictaphone Corporation, South Norwalk, Conn.

[22] Filed: June 7, 1973

[21] Appl. No.: 367,750

[52] U.S. Cl. ............ 360/60; 360/62; 179/100.1 DR

[51] Int. Cl.$^2$ ............ G11B 15/04

[58] Field of Search ............ 360/60, 62, 93, 96; 179/100.1 DR

[56] References Cited

UNITED STATES PATENTS

| | | | |
|---|---|---|---|
| 2,909,617 | 10/1959 | Shields | 360/60 |
| 3,078,350 | 2/1963 | Lyon | 360/93 |
| 3,547,446 | 12/1970 | Kern | 360/90 |
| 3,581,022 | 5/1971 | Shigetomi | 360/60 |
| 3,591,186 | 7/1970 | Murata | 360/62 |
| 3,712,961 | 1/1973 | Nye | 179/100.1 DR |
| 3,766,326 | 10/1973 | Buchholz | 179/100.1 DR |
| 3,785,658 | 1/1974 | Ikeda | 360/60 |

*Primary Examiner*—James W. Moffitt
*Assistant Examiner*—Alan Faber
*Attorney, Agent, or Firm*—Curtis, Morris & Safford

[57] ABSTRACT

A control mechanism for a hand-held dictating apparatus wherein the control switches to place the apparatus in a dictate or record, playback and/or rewind mode is readily operable by one finger of the user. Two in line slide switch elements are provided, one controlling start, stop and rewind and the second controlling record and playback. The switches are functionally interrelated so that if the apparatus is in the record mode and the dictator places the apparatus in rewind to review previously recorded material, the record-playback switch is automatically placed in a playback position so that when the apparatus is again placed in the start mode previously dictated material is not inadvertently recorded over.

10 Claims, 5 Drawing Figures

CONTROL MECHANISM FOR HAND-HELD DICTATION APPARATUS WITH ERASURE PREVENTION CAPABILITIES

The present invention relates to a hand-held dictation apparatus and more particularly to hand-held dictation apparatus control mechanisms.

With the advent and increasing popularity of hand-held portable recording equipment utilizing cassette tape cartridges and mini-cassette tape cartridges, the miniaturization of the control circuitry has created problems which make operation of such hand-held dictation equipment cumbersome. While the convenience afforded by this type of readily portable and easily transportable dictation equipment has assured a ready market and demand for its use, many of these hand-held dictation devices suffer from the drawback of inconvenient control mechanisms which make them cumbersome to use.

In many of these hand-held dictation equipment numerous external switches are provided which must be individually actuated to place the equipment in the stop, start, record, playback or rewind modes. Such multiplicity of switching elements often requires that the user visually inspect the apparatus when a change of mode is desired. This visual coordination is a disadvantage in that it necessitates a conscious effort on the part of the user and an interruption in his train of thought while using the dictation apparatus.

Accordingly, it is an object of the present invention to provide a control mechanism for hand-held dictation apparatus which is readily and simply operable by one finger of the user and which can be operated without any conscious effort or visual attention on the part of the user.

A further object of the present invention is to provide a control mechanism for a hand-held dictation apparatus which utilizes a minimum number of switching elements with the switching elements interrelated to perform a multiplicity of functions with the actuation of but a single switch element.

A still further object of the present invention is to provide a control mechanism for hand-held dictation equipment where an interlock is provided between switching elements to preclude inadvertent recording over previously recorded dictation material.

These and other objects and advantages of the present invention will be more readily apparent after consideration of the following specification in conjunction with the accompanying drawing, wherein.

Figure 1:
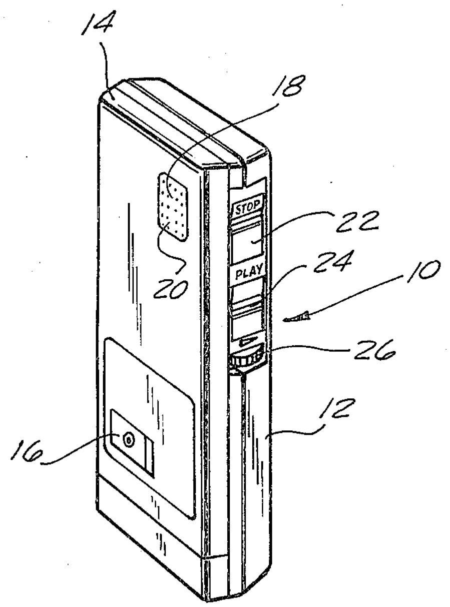
FIG. 1 is a perspective view of a preferred embodiment of a hand-held dictation apparatus incorporating the present invention.
Figure 2:
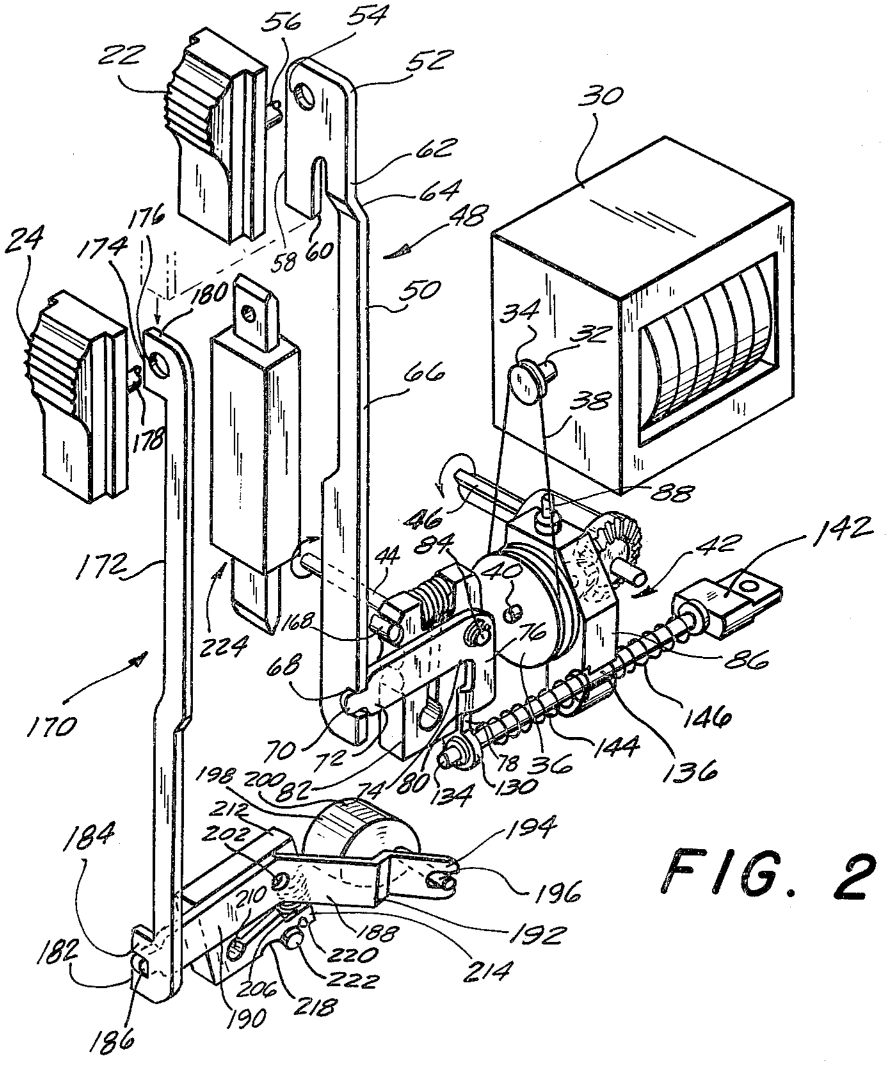
FIG. 2 is an exploded perspective view showing the interrelationship of some of the elements of the control mechanism of the present invention.

With reference to the drawing and particularly FIG. 1, the hand-held dictation apparatus 10 is shown comprising a casing 12 and a slide cover 14 which slides relative to the casing 12 to permit access to a tape cassette 16. Tape cassette 16 is preferably of the mini-cassette variety housing two spools or reels wherein the magnetic tape is driven from reel to reel passed a recording and playback transducer head within the apparatus. The dictating apparatus 10 also includes a combination speaker-microphone 18 accessible through a speaker grill opening 20 in the cover 14.

Control switch members 22 and 24 are slidably mounted with respect to the casing 12 to control the operating modes of the dictation apparatus 10 and a volume control element 26 is also provided for ready accessibility by a single finger of the user as the apparatus 10 is held in the user's hand.

The operating modes for the dictation apparatus 10 are a stop-neutral mode where the device is inactive, a start mode to operate the dictation apparatus to drive the tape in a forward direction in either playback or record and a rewind mode to reverse the direction of the tape movement, for example when the dictator wants to rewind the tape to playback previously recorded material. The slide switch element 22 controls the start, stop and rewind modes and slide switch element 24 controls the playback or record modes.

Referring now to FIGS. 2 through 5, the hand- held dictation apparatus 10 includes an internal chassis assembly 28 to which is affixed the various mechanical and electrical components of the dictation apparatus. Included in the components are a DC motor 30 having an output shaft 32 and a drive pulley 34 affixed thereto. Drive pulley 34 is interconnected with a driven pulley 36 by a drive belt 38. Driven pulley 36 is affixed to a shaft 40 in a power translation assembly 42 to selectively drive capstan assemblies 44 and 46. Capstan assemblies 44 and 46 include elements which fit within the sprocketed hubs of a cassette 16 inserted within the dictation apparatus 10 in a conventional manner with capstan assembly 44 being actuated to drive the tape in cassette 16 in a forward direction for either recording or playback and capstan assembly 46 being driven to rewind the tape in cassette 16.

The forward, rewind or neutral-stop modes are controlled by slide switch element 22 through a linkage assembly 48 and the power translation assembly 42. Slide switch element 22 has three operative positions, a central- neutral-stop position which places the apparatus in an inactive mode, an upward start position which activiates the motor 30 to drive the forward drive capstan assembly 44 and a downward rewind position where motor 30 now drives capstan assembly 46 to reverse the direction of tape movement and rewind the tape in cartridge 16.

Linkage assembly 48 includes a slide member 50 having an upper flat segment 52 provided with an aperture 54 therethrough to accommodate a post 56 extending from the rear of slide switch element 22. The upper flat segment 52 includes a first depending leg 58 terminating in a flat contact surface 60, the function of which will be described more fully hereinbelow, and a second depending leg 62 terminating in an offset segment 64 integral with an elongated slide segment 66. A slot 68 is provided in the lower portion of slide segment 66 to accommodate the nodular end 70 of one leg 72 of an L-shaped arm 74. The other leg 76 of arm 74 is provided with an offset segment 78 extending inwardly from the plane passing through the longitudinal axis of leg 72.

The offset segment 78 of leg 76 is held within a slot 80 of a resilient member 82, preferably formed of a material such as nylon. Arm 74 and the resilient member 82 are pivotally mounted to the chassis assembly 28 on a post 84 extending thereform. Because of the interconnection of the arm 74 to the resilient member 82 the arm and resilient member pivot about post 84 simultaneously. Thus, as the slide switch 22 is moved to any one of its three operating positions, slide member 50 reciprocably moves to impart a pivoting action to the arm 74 and the resilient member 82.

The power translation assembly 42 includes a housing 86 having a post 88 extending longitudinally therethrough. Post 88 (see FIG. 4) is suitably journaled in upstanding segments 90 and 92, respectively, of the chassis assembly 28 so that the power translation assembly 42 is pivotally mounted within the apparatus. Shaft 40 is rotatably journaled within housing 86 (see FIG. 5) by appropriate bearings 94 and extends beyond the housing 86 on both sides of the housing.

The capstan assembly 44 (see FIG. 4) includes a central post 96 secured in a bearing member 98 in chassis assembly 29 and a hub 100 is rotatably positioned over post 96. The hub 100 includes an upper cylindrical segment 102, an intermediate flanged segment 104 and a lower flanged segment 106. A pin 108 is embedded within the intermediate flanged segment 104 adjacent the cylindrical segment 102 with both the pin 108 and the cylidrical segment 102 adapted to fit within the sprocket of a tape spool in a cassette so that rotation of the hub 100 will engage the sprocket teeth of the tape spool and drive the tape within the cassette. The lower surface of the flanged segment 106 is provided with a frictional bearing surface 110 which is adapted to be frictionally contacted by an extending end 112 of shaft 40. Thus, when the end 112 of shaft 40 is maintained in contact with the surface 110 the hub 100 is rotated as shaft 40 rotates to drive tape capstan assembly 44.

Capstan assembly 46 is similarly constructed and includes a post 114 fixed in a bearing member 116 in the chassis assembly 128 and includes a hub 118 rotatably mounted thereon. The upper end of the hub 118 includes a cylindrical segment 120 having an integrally molded extending segment 122 to similarly fit within an engaged sprocket of a tape spool in a tape cassette. The lower segment of the hub 118 is formed as a bevel gear segment 124. The extending end 126 of shaft 40 is provided with a mating bevel gear 128 which is adapted to mesh with and engage bevel gear 124 formed on hub 118. Thus, when bevel gear 128 is in engagement with bevel gear segment 124 the capstan assembly 46 is driven to drive the tape in cassette 16 in a reverse, rewind direction.

Thus, it is seen that selective drive of capstan assemblies 44 or 46 is determined by the engagement of shaft end 112 with surface 110 of hub 100 to drive capstan assembly 44 or by the engagement of bevel gear segment 128 affixed to shaft 40 with the bevel gear segment 124 to drive the hub 118 and capstan assembly 46. The selection of either the forward or the reverse mode of tape drive is determined by pivoting the power translation assembly 42 to either of the alternate positions in engagement with capstan assemblies 44 and 46.

The pivoting of power translation assembly 42 is responsive to the position of slide switch 22 through the linkage assembly 48 and L-shaped arm 74 which is linked to the power translation assembly 42.

The lower segment of leg 76 of L-shaped arm 74 includes an extension 130 provided with an aperture 132 therethrough within which is secured one end 134 of a linking rod 136. Linking rod 136 passes through an accommodation slot 138 in housing 86 and has its other end 140 secured to within abutment member 142. A first compression spring 144 is provided about linking rod 136 between arm 74 and the housing 86 and a second compression spring 146 is provided about linking rod 136 between the abutment stop 142 and the housing 86.

Figure 3:
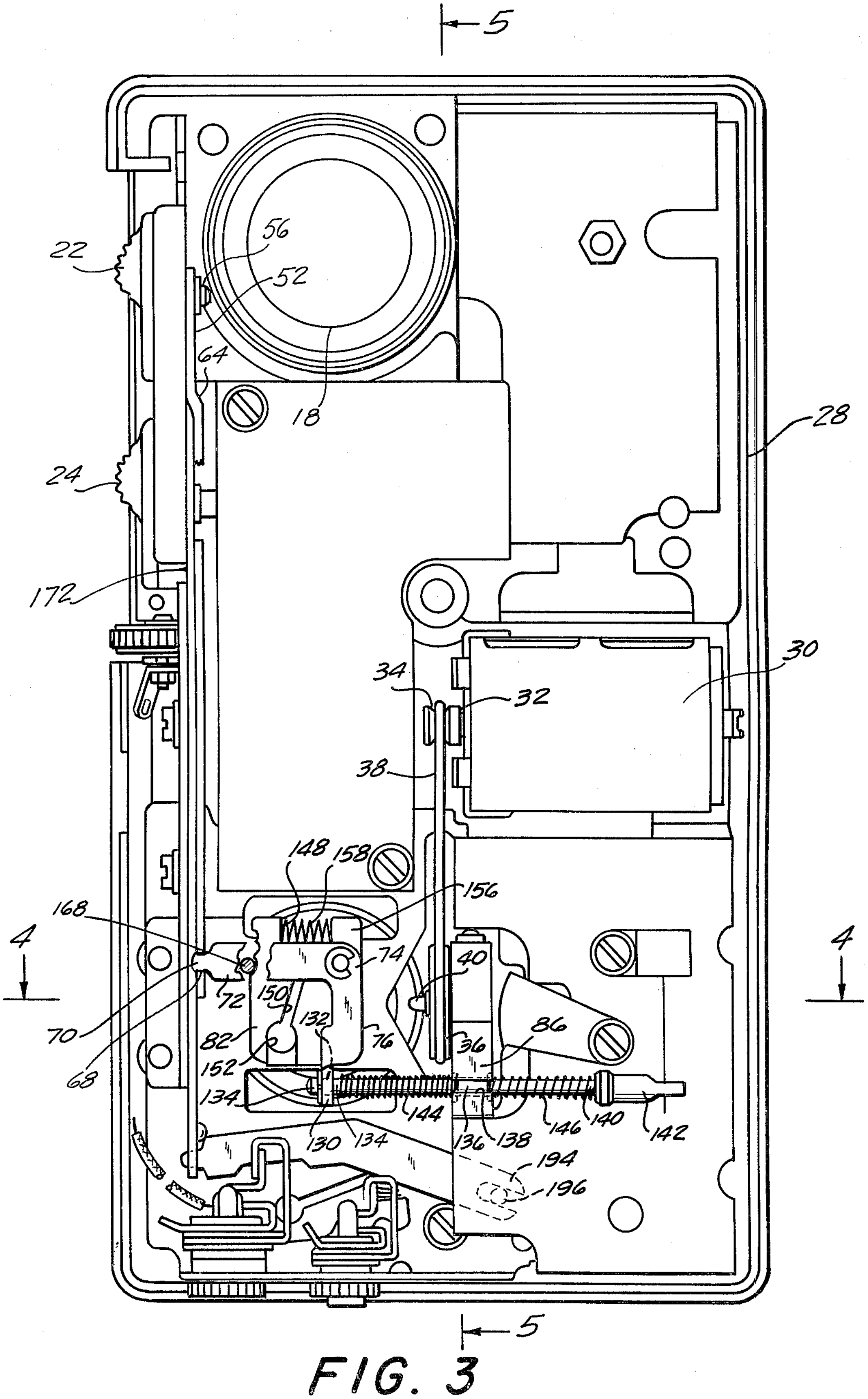
FIG. 3 is a plan view showing the assembly of the hand-held dictation equipment and the control mechanism of the present invention.
Figure 4:
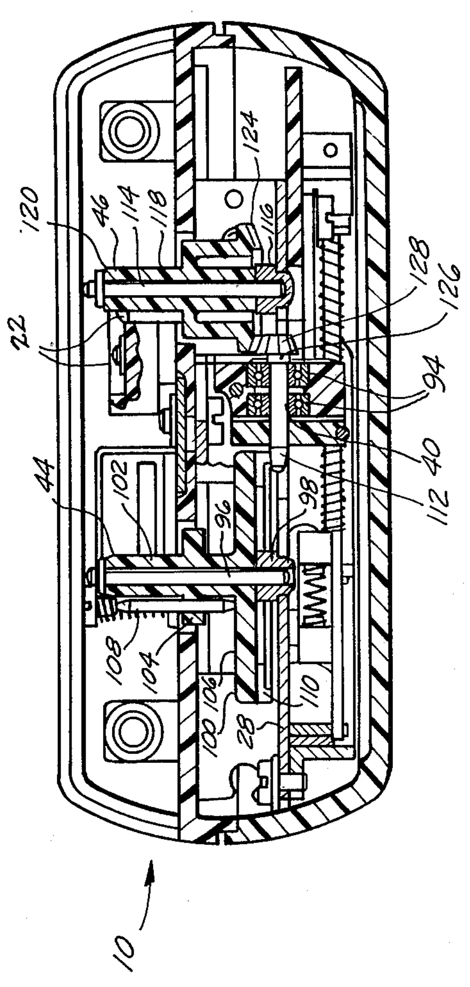
FIG. 4 is a sectional view taken along the line 4—4 of FIG. 3.
Figure 5:
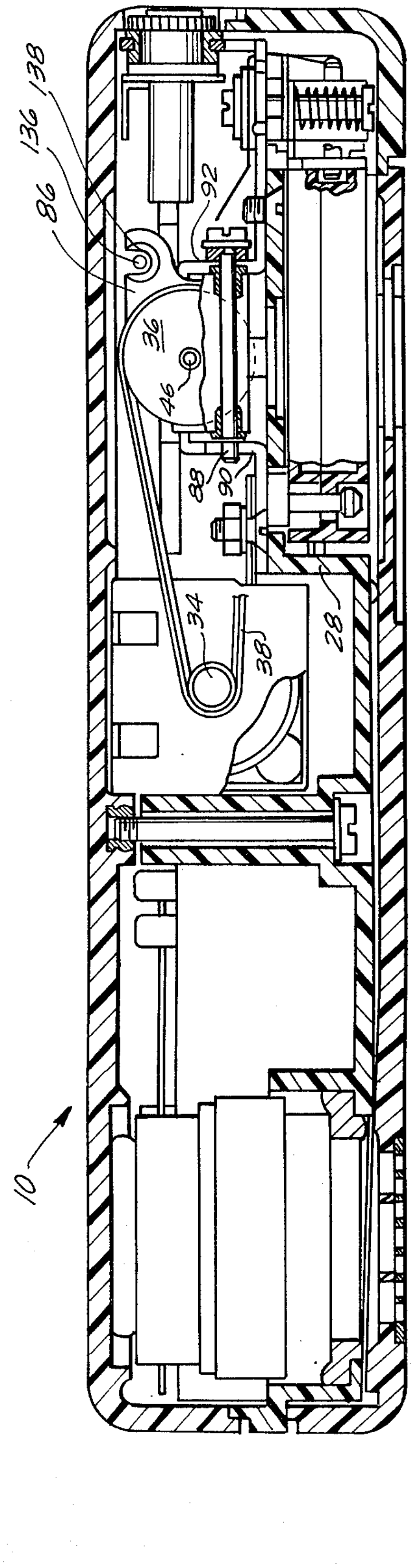
FIG. 5 is a sectional view, with parts broken away, taken along the line 5—5 of FIG. 3.

As slide switch member 22 is moved into the upward position to place the apparatus in the start mode, leg 72 of arm 74 is moved upwardly, as viewed in FIG. 3, drawing leg 76 to the left. This movement pivots the housing 86 of the power translation assembly 42 so that shaft end 112 is pivoted into frictional contact with surface 110 of hub 100. Spring 146 is compressed and reacts between abutment 142 and housing 86 to urge shaft end 116 to remain in contact with surface 110.

When slide switch 22 is moved downwardly to place the apparatus in a rewind mode, leg 72 of the L-shaped arm 74 moves downwardly and leg 76, as viewed in FIG. 3, moves to the right. Spring 144 is now compressed and reacts between arm 74 and housing 86 to urge housing 86 of power translation assembly 42 to pivot so that shaft end 112 disengages from frictional contact with surface 110 of hub 100 and to urge bevel gear segment 128 to pivot into engagement with the bevel gear surface 124 of hub 118 so that the motor now drives capstan assembly 46.

Preferably slide switch member 22 remains in the neutral and the start positions once the switch has been moved to these positions but the switch is resiliently biased so that the slide switch 22 will not remain in the rewind position unless finger pressure is maintained on the switch. Accordingly, provision is made to resiliently bias slide switch 22 through the resilient member 82 to return the switch to the stop or neutral position once pressure has been removed from the slide switch element 22.

Resilient member 82, as noted above, is pivotally mounted on post 84 and is operatively joined to the L-shaped arm 74 so that the resilient member 82 pivots with arm 74 responsive to the position of slide switch 22.

Resilient member 82 is constructed of a flexible material, preferably a material such as nylon, and is substantially rectangular in plan. Member 82 includes a cutout segment 148 in the upper end, as viewed in FIG. 3, which leads into an angled slot 150 of smaller constriction than the cutout 148 and terminates in a circular aperture 152 through the member 82. The cutout 148, slot 150 and the aperture 152 esstntially define a bifurcated member so that the resilient member 82 includes a first leg 154 and a second leg 156. A compression spring 158 is provided in cutout 148 to resiliently urge legs 154 and 156 away from each other.

The exterior surface of leg 154 of the resilient member 82 is provided with a notch 160, which is preferably semi-circular in plan configuration, and a second notch 162 adajacent thereto having a maximum depression at 164 leading into an outwardly inclined surface 166. A post 168 is provided extending from the chassis assembly 28 and the post 168 fits withing the semi-circular notch 160 and in the depression 164 of notch 162 when the slide switch 22 is in the start-forward drive position and stop-neutral position, respectively. Thus, when slide switch 22 is in either of these two positions post 168 cooperates with the notches 160 and 162 in the resilient member 82 to retain the linkage mechanism 50, arm 74 and the power translation assembly 42 in its fixed position for these modes.

However, the interaction of the inclined surface 166 and the post under the action of the compression spring 158 tends to pivot the resilient member 82 to urge the resilient member 82 to return to the stop-neutral mode with the post 168 within the depression 164 when the force retaining slide switch 22 in the downward or rewind position is removed. Hence, the action of the compression spring 158 urging the legs 156 and 154 away from each other results in a force developed by leg 154 on the post 168 which returns the resilient member 82 toward the stop-neutral position with post 168 retained in depression 164.

The resulting pivoting movement imparted to the resilient member 82 is imparted to the arm 74 as well so that the relative position of the power translation assembly 42 is changed according to the position of resilient member 82 with respect to the post 168. Thus, it is evident that in order to retain the apparatus in the rewind or backspace mode, a continuing force must be applied to slide switch 22 to hold it in its downward rewind position and once this force is removed, the slide switch, through the linkage assembly 50 is returned to the neutral-stop position.

Slide switch 24, as noted above, controls the record or playback modes and accordingly slide switch 24 is movable between a first upper position which places the apparatus in the record mode to a second lower position which places the apparatus in the playback mode. The playback or record mode is controlled by slide switch element 24 through a linkage assembly 170 which includes a slide member 172 having an upper offset ear 174 provided with an aperture 176 therethrough to accommodate a post 178 extending from the rear of slide switch element 24. The extending ear 174 includes an upper flat surface 180 which cooperates with the contact surface 60 of slide member 50, as will be described more fully hereinbelow.

The lower end of slide member 172 includes an extending ear 182 having a slot 184 therein to accommodate the end 186 of a lever arm 188. Lever arm 188 includes a first leg 190 which has its end 186 engages within slide member 172 and a second leg 192 angularly offset with respect to leg 190. Leg 192 includes a slot 194 at its free end to slidably engage a post 196. Post 196 is fixed to an erase head member 198 which is pivotally secured to the chassis assembly 28. Erase head 198 has an exterior surface configuration approximating a quadrant of a cylinder and is provided with a segment 200 on the exterior surface of finite width which is a magnetized strip.

The path of the tape within a cassette operatively engaged within the dictation apparatus 10 passes over, and in sliding contact with, the erase head member 198. Slide switch element 24, through the linkage assembly 170, pivots the erase head 198 so that the magnetized strip 200 is in contact with the tape in a cassette when switch 24 is placed in the upper position to place the apparatus in the record mode so that prior to the tape's movement over the transducer head, previously recorded material is erased from the tape. Whern the slide switch element 24 is placed in the lower position to place the apparatus in the playback mode, erase head 198 is pivoted so that the magnetized strip 200 is not in contact with the tape. Thus, tape passing over the head 198 is now not in contact with the magnetized strip and previously recorded material is not erased from the tape and is picked up by the transducer head to be placed back.

To pivot the erase head 198 between its two operating positions lever arm 198 is pivotally attached as at 202 on a post extending from the chassis assembly 28 and as the slide switch element 24 is moved between its two operating positions, linkage arm 172 moves up and down, as viewed in FIG. 3, to pivot lever arm 188 which pivots the erase head 198 appropriately.

A resilient member 204 is also provided pivotally mounted on post 202 and is similar in construction to the resilient member 82 described hereinabove. Accordingly, the resilient member 204 includes a cutout 206 leading into an angular slot 208 and a circular aperture 210 to form, in essence, a bifurcated member having legs 212 and 214, respectively, with a compression spring member 216 disposed within the cutout 206 to resiliently urge the two legs 212 and 214 away from each other.

The exterior surface of leg 214 of resilient member 204 includes semi-circular shaped notches 218 and 220 therein and a post 222 is provided extending from chassis assembly 28 to cooperatively engage in notches 218 and 220 when slide switch 24 is moved between its respective operating positions.

Thus, when slide switch 24 is in its upward or record position post 222 rests in notch 220 and when slide switch 24 is moved to its downward or playback position post 222 rests in notch 218. The outward resilient biasing imparted to legs 212 and 214 of resilient member 204 assists in assuring the positive retention of pose 222 within either of the notches 218 or 220 to retain the slide switch 24 and the apparatus itself in either the playback or record modes until slide switch 24 is physically moved by application of an external force.

An electrical switch assembly 224 is also associated with slide switch 24 and includes a switch housing 226 having a slide member 228 slidably disposed therein. Slide member 228 has an aperture 230 in its upper end which accommodates post 178 of slide switch element 24 so that the slide member 228 moves upwardly and downwardly in the switch housing 226 responsive to the position of slide switch element 24.

Switch assembly 224 controls the electrical circuitry (not shown) associated with the dictation apparatus to switch the electrical circuitry between the playback and record modes. Thus, with slide member 228 in its upward position the apparatus is electrically switched to record mode and with slide member 228 in its downward position the apparatus is switched to playback mode.

In operation, to record using the dictation apparatus 10, a cassette is loaded in the apparatus, slide switch element 24 is moved to its upward record position and slide switch element 22 is moved from its central stop position to its upward start position. This activates motor 30 to drive capstan assembly 44 and drive the tape in cassette 16 past the transducer head (not shown). Because slide switch element 24 has placed the apparatus electrically into its record mode, the user can dictate into speaker-microphone 18 and the material is recorded on the tape. Erase head member 198 is positioned so that the magnetic strip 200 is in contact with the tape and prior to the tape reaching the transducer head the tape is magnetically erased.

To listen back to previously recorded material, slide switch 22 is moved downwardly through the central neutral-stop position to its downward rewind position.

This movement pivots power translation assembly 42 to drive capstan assembly 46 and reverse the direction of tape movement.

As slide switch element 22 moves downwardly, the contact surface 60 of the slide member 50 moves into abutting contact with the flat surface 180 of slide member 172 and the downward movement of slide 50 responsive to the downward movement of slide switch element 22 moves the slide 172 and slide switch element 24 from the upward record mode to the lower playback mode.

Thus, when slide switch element 22 is placed in its rewind mode, the apparatus is simultaneously switched from the record to the playback mode. This pivots erase head 198 to remove magnetic strip 200 from tape contact so that as tape is rewound it is not erased. When the user releases finger pressure from slide switch element 22, the slide switch returns under the resilient bias of resilient member 82 to the neutral-stop position and slide switch element 24 remains in the playback mode.

Now the user can move slide switch element 22 to the upward start position and, as slide switch element 24 has switched the apparatus to a playback mode, material previously recorded will be played back. This feature precludes inadvertent dictation over previously recorded material after tape has been rewound. Thus, should the user want to dictate over previously recorded material to change his dictation a conscious change in the position of slide switch element 24 is necessary.

I claim:

1. A control mechanism for a hand-held dictation apparatus which includes a casing enclosing said dictation apparatus and a chassis assembly secured within said casing adapted to operatively support the components of said dictation apparatus, said control mechanism comprising:

a first switch assembly including a slide switch element accessible from exterior said casing and movable to operatively control the forward drive, stop and reverse drive modes for the recording medium, a second switch assembly including a slide switch element accessible from exterior said casing and movable to operatively control the record and playback modes of said apparatus, said first and second slide switch elements being movable along a path within the same plane, and said first and second switch assemblies including linkage means movable along a straight line path in a closely adjacent parallel plane for interrelating said switch assemblies to move said second switch assembly into playback mode responsive to said first switch assembly movement into reverse drive mode.

2. A control mechanism as defined in claim 1 wherein, said first switch element is slidably movable on said casing through a forward drive position, an intermediate neutral-stop position and a reverse drive position and said first switch assembly includes a slide member within said casing coupled to said first slide switch element, said second switch element is slidably movable on said casing through two operative positions and said second switch assembly includes a slide member within said casing coupled to said second slide switch element, said first and second slide members including means associated with each adapted to be contacted when said first slide switch element is moved to the operative position corresponding to reverse drive mode thereby moving said second slide member to the operative position corresponding to the playback mode.

3. A control mechanism as defined in claim 2 wherein said dictation apparatus includes a forward drive means operatively mounted on said chassis assembly to drive said recording medium in a forward direction through said apparatus and a reverse drive means operatively mounted on said chassis assembly spaced from said forward drive means to drive said recording medium in a reverse direction through said apparatus, a motor mounted on said chassis assembly, said motor having an output shaft operatively coupled to a power translation assembly means, said power translation assembly means pivotally mounted on said chassis assembly and pivotable between a first position in operative driving relationship with said forward drive means and a second position in operative driving relationship with said reverse drive means, said first switch assembly including linking means linking said slide member of said first switch assembly to said power translation assembly to pivot said power translation assembly between said first and second positions responsive to movement of said slide member from its intermediate neutral-stop position to its reverse drive position.

4. A control mechanism as defined in claim 3 including biasing means associated with said first switch assembly to bias said switch assembly from said reverse drive position into said neutral-stop position when no external force is applied to said first slide switch element.

5. A control mechanism for a hand-held dictation apparatus which includes a casing enclosing said dictation apparatus and a chassis assembly secured within said casing adapted to operatively support the components of said dictation apparatus, said apparatus being adapted to receive a cassette of magnetic tape wherein said tape is fed from one reel to another within said cassette, said control mechanism comprising:

a first switch assembly including a slide switch element accessible from exterior said casing and movable to operatively control the forward drive, stop and reverse drive modes to drive said tape, a second switch assembly including a slide switch element accessible from exterior said casing and movable to operatively control the record and playback modes of said apparatus, said first and second slide switch elements being movable aong a path within the same plane, and said first and second switch assemblies including linkage means movable along a straight line path in a closely adjacent parallel plane for interrelating said switch assemblies to move said second switch assembly into playback mode responsive to said first switch assembly movement into reverse drive mode.

6. A control mechanism as defined in claim 5 wherein, said first switch element is slidably movable on said casing through a forward drive position, an intermediate neutral-stop position and a reverse drive position and said first switch assembly includes a slide member within said casing coupled to said first slide switch element, said second switch element is slidably movable on said casing through two operative positions and said second switch assembly includes a slide member within said casing coupled to said second slide switch element, said first and second slide members including means associated with each adapted to be contacted when said first slide switch element is moved to the operative position corresponding to reverse drive mode thereby moving said second slide member to the operative position corresponding to the playback mode.

7. A control mechanism as defined in claim 6 wherein said dictation apparatus includes a forward drive means operatively mounted on said chassis assembly to engage one of said cassette reels to drive said tape in a forward direction through said apparatus and a reverse drive means operatively mounted on said chassis assembly spaced from said forward drive means to engage the other of said cassette reels to drive said tape in a reverse direction through said apparatus, a motor mounted on said chassis assembly, said motor having an output shaft operatively coupled to a power translation assembly means, said power translation assembly means pivotally mounted on said chassis assembly and pivotable between a first position in operative driving relationship with said forward drive means and a second position in operative driving relationship with said reverse drive means, said first switch assembly including linking means linking said slide member of said first switch assembly to said power translation assembly to pivot said power translation assembly between said first and second positions responsive to movement of said slide member from its intermediate neutral-stop position to its reverse drive position.

8. A control mechanism as defined in claim 7 including biasing means associated with said first switch assembly to bias said switch assembly from said reverse drive position into said neutral-stop position when no external force is applied to said first slide switch element.

9. A control mechanism as defined in claim 6 wherein said first switch assembly includes an L-shaped arm pivotally mounted on said chassis assembly, one end of said arm being secured to said first slide member and the other end of said arm being fixed to a resilient member, said resilient member including internal resilient means biasing said arm and said first slide member from its reverse drive position into said neutral-stop position.

10. A control mechanism as defined in claim 6 wherein said apparatus includes means to magnetically erase magnetic tape, said means being pivotally mounted on said chassis assembly and pivotable between a first position in magnetic contact with said tape thereby to erase said tape when tape is driven thereover and a second position out of magnetic contact with said tape, said second slide member including linking means linking said second slide member to said means to magnetically erase tape thereby to pivot said means from said first position to said second position when said second switch element is moved from its record mode position to its playback mode position.

* * * * *